(12) United States Patent
Overbeck (10) Patent No.: US 6,572,061 B2
(45) Date of Patent: Jun. 3, 2003

(54) ADJUSTABLE BASE STRUCTURE

(75) Inventor: James Overbeck, Fond du Lac, WI (US)

(73) Assignee: Overbeck/Ahern LLC, Fond du Lac, WI (US)

( * ) Notice: Subject to any disclaimer, the term of this patent is extended or adjusted under 35 U.S.C. 154(b) by 0 days.

(21) Appl. No.: 09/888,018

(22) Filed: Jun. 25, 2001

(65) Prior Publication Data

US 2002/0195528 A1 Dec. 26, 2002

(51) Int. Cl.[7] .............................................. F16M 11/36
(52) U.S. Cl. ................................. 248/188.6; 248/163.1
(58) Field of Search .............................. 248/163.1, 165, 248/166, 440, 188.2, 188, 167, 168; 297/344.12, 325

(56) References Cited

U.S. PATENT DOCUMENTS

| | | | | |
|---|---|---|---|---|
| 4,203,242 A | * | 5/1980 | Griffin ........................... 40/610 |
| 4,266,748 A | * | 5/1981 | Dalton ........................ 248/425 |
| 4,296,509 A | * | 10/1981 | Simmons et al. ............. 5/81 R |
| 4,317,552 A | * | 3/1982 | Weidler ....................... 248/168 |
| 4,378,100 A | * | 3/1983 | Minozzi et al. ............. 248/168 |
| 4,932,719 A | * | 6/1990 | Rojas .......................... 297/338 |
| 5,485,978 A | * | 1/1996 | Hernandez .................. 248/165 |
| 5,505,524 A | * | 4/1996 | Drumwright ........... 297/440.24 |
| 5,857,748 A | * | 1/1999 | Knight ..................... 297/451.2 |
| 6,305,653 B1 | * | 10/2001 | Oldham et al. .......... 248/177.1 |

* cited by examiner

*Primary Examiner*—Leslie A. Braun
*Assistant Examiner*—Kofi Schulterbrandt
(74) *Attorney, Agent, or Firm*—Donald Cayen (57) ABSTRACT

An adjustable base structure supports a person in an upright attitude on uneven terrain and comprises a plate and multiple legs independently pivotally connected to the plate. When in an operative mode, the legs diverge from each other and from the plate and rest on the terrain to orient the plate horizontally. A cable connects the legs and maintains them in the operative mode. A bushing on the plate receives a post of a carrier that is attached to a seat. When the carrier post is in the bushing, the person can sit upright regardless of the contour of the terrain. A dome-shaped pad is joined to each leg for swiveling in a manner that accommodates the terrain and that supports the adjustable base structure in soft soil. Different lengths of the cable are storable inside one of the legs to adjustably limit the amount of pivoting of the legs.

27 Claims, 13 Drawing Sheets

ADJUSTABLE BASE STRUCTURE

BACKGROUND OF THE INVENTION

1. Field of the Invention.

This invention pertains to structures that support persons and objects above the ground, and more particularly to apparatus that supports persons and objects in an upright attitude regardless of the ground contour.

2. Description of the Prior Art.

Various types of equipment have been developed to support persons and objects on uneven terrains. Much of the prior equipment includes three legs, because three legs inherently provide stable support. Milk stools and camera tripods are well known examples of three-legged equipment used to stably support persons and objects, respectively.

To accommodate uneven terrains, some prior equipment included telescoping legs. Such equipment was undesirably expensive. In addition, trial and error was required to properly set the telescoping legs in order to attain a desired attitude for the person or object being supported.

Supporting a person in an upright attitude on uneven terrain is particularly important for hunters and fishermen. It is very uncomfortable to sit outdoors for even a short time unless the person is substantially upright. Consequently, seats and stands that can adjust to varying terrains are highly desirable to outdoorsmen.

An example of a prior attempt to solve the problems associated with sitting on uneven terrain is shown in U.S. Pat. No. 4,266,748. That patent describes a seat-supporting leg having a pointed free end that is insertable into the ground in a vertical attitude. The U.S. Pat. No. 4,266,748 patent also shows a variation in which three legs can pivot independently about a central tube. A cable connects the legs.

U.S. Pat. No. 4,934,638 shows multiple variations of a tripod stool with telescoping legs. U.S. Pat. No. 5,364,163 teaches a four-legged chair in which the two back legs are adjustable together relative to the front legs. U.S. Pat. No. 5,485,978 shows a three-legged stand with a seat on which a hunter can sit high above the ground.

U.S. Pat. No. 4,708,308 shows a portable stool in which three legs are independently pivotable about a support hub. The amount of pivoting of the legs is limited by a flexible cord.

British patent 1,598,812 discloses a support device useful for road signs and display boards. The British design includes three relatively pivotable legs tied together by a flexible chain.

Despite the availability of various seats and stands that can be used on uneven terrain, there nevertheless is room for further developments to them.

SUMMARY OF THE INVENTION

In accordance with the present invention, a versatile and convenient adjustable base structure is provided that stably supports persons and objects in an upright attitude on uneven terrain. This is accomplished by apparatus that includes a plate to which is connected the first ends of multiple independently and adjustably pivotable legs.

According to one aspect of the invention, there are four legs pivotally connected to the plate. Preferably, two first legs pivot in a first plane, and two second legs pivot in a second plane that is perpendicular to the first plane. The legs are selectively pivotable to a storage mode whereat they are generally parallel to each other and perpendicular to the plate. The legs are also pivotable to an operative mode whereat they diverge from the plate and each other. The amount of leg pivoting in the operative mode is limited by an endless flexible cable that connects the legs.

It is a feature of the invention that the legs can be pivotally connected to the plate in different ways. For example, the pivotal connections may include pairs of lugs that depend from the plate underside. A pin passing through a pair of lugs and the upper end of a leg completes the pivotal connection for that leg. Alternately, the plate may be notched for each leg. A pin held in the plate passes through the notch and a leg upper end to form the pivotal connection.

A foot of traction-type material is incorporated into the lower end of each leg. Also near the lower end of each leg is a pad. In the preferred embodiment, the pads are dome-shaped, with the concave sides of the pads facing the lower ends of the legs. The pads are swivelable on the legs. The pads swivel in the same planes in which the associated legs pivot relative to the plate. Each pad can be swiveled such that it lies in a plane that is approximately perpendicular to the associated leg. In that situation, the foot of leg lower end protrudes a short distance past the pad.

Upstanding from the plate top surface is a post with a flange adjacent the plate. A bushing joined to a carrier fits over the post and is axially supported by the flange. Alternately, the bushing may be in the plate, and the post is then part of the carrier. The carrier can be attached to any of a large number of standard components, such as commercially available boat seats. The bushing and post arrangement enable the carrier and seat to turn about the base structure. To best distribute the weight of a person sitting on the seat, the bushing or post is offset from the center of the carrier.

The individually pivotable legs enable the base structure to be used on ground or terrain of practically any contour. The legs are pivotable at different angles relative to the plate and to each other. Further, the plate can be oriented to be horizontal regardless of the angles of the various legs. The cable retains the legs in their desired locations regardless of any weight applied to the base structure. In that manner, a person sitting on the seat is upright and remains so as he turns the seat about the base structure. Instead of attaching to and supporting a boat seat or the like, the plate can be designed to removeably support a conventional chair, such as a lawn chair.

Further in accordance with the present invention, the total amount of pivoting of the legs is adjustable. For that purpose, at least one of the legs is hollow, and it includes multiple pairs of transverse holes through it. A first pair of holes receives the cable such that there is a length of the cable inside the hollow leg. One end of a tail is fastened to the cable length inside the leg. The other end of the tail emerges from the leg, as through a tail hole. Between the first pair of holes and the tail hole are a number of longitudinally spaced second pairs of transverse holes. A pin is removeably inserted into any of the second pair of holes between the cable length inside the leg and the first pair of holes. The pin has the effect of storing a portion of the cable inside the leg. Consequently, pivoting of the legs in the operative mode is adjustably limited by inserting the pin into different second pairs of holes.

If the support surface is hard, the feet on the legs lower ends bear the weight directly, and the pads do not come into use. If the ground is soft, however, the feet sink until the pads come into contact with the ground. The pads automatically swivel such that they lie in flat facing contact with the ground surface. The domed shape of the pads allows soft soil to fill in under the pads and thereby firmly grip the soil. The pads then bear the weight of the adjustable base structure and any person or object supported by it. The adjustable base structure of the invention is thus ideal for using in swampy or sandy soils.

The method and apparatus of the invention, using multiple legs independently and adjustably pivotable at respective upper ends about a plate, thus enables the plate to be oriented horizontally regardless of the contour of the supporting terrain. The pads virtually eliminate the probability that the plate will tilt during use, even though the base structure is used on soft soils. Other advantages, benefits, and features of the present invention will become apparent to those skilled in the art upon reading the detailed description of the invention.

DETAILED DESCRIPTION OF THE INVENTION

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Referring to FIGS. 1, 2, 6, and 7, an adjustable base structure 1 is illustrated that includes the present invention. The adjustable base structure 1 is particularly useful for stably supporting persons and objects on natural ground. However, it will be understood that the invention is not limited to outdoor applications.

The adjustable base structure 1 is comprised of a plate 5 and a number of legs 7. In the particular construction illustrated, the adjustable base structure has four legs 7A, 7B, 7C, and 7D. It will be appreciated, of course, that three legs, or more than four legs, can be used as well as the four legs 7A–7D that are illustrated. To keep the weight of the adjustable base structure 1 to a minimum, the plate 5 and the legs 7 are made of aluminum, and the legs are made as tubes having a relatively thin wall. Each leg 7A–7D has an upper end 9 that is pivotally connected to the plate 5 by a respective pivotal connection 10.

Figure 1:
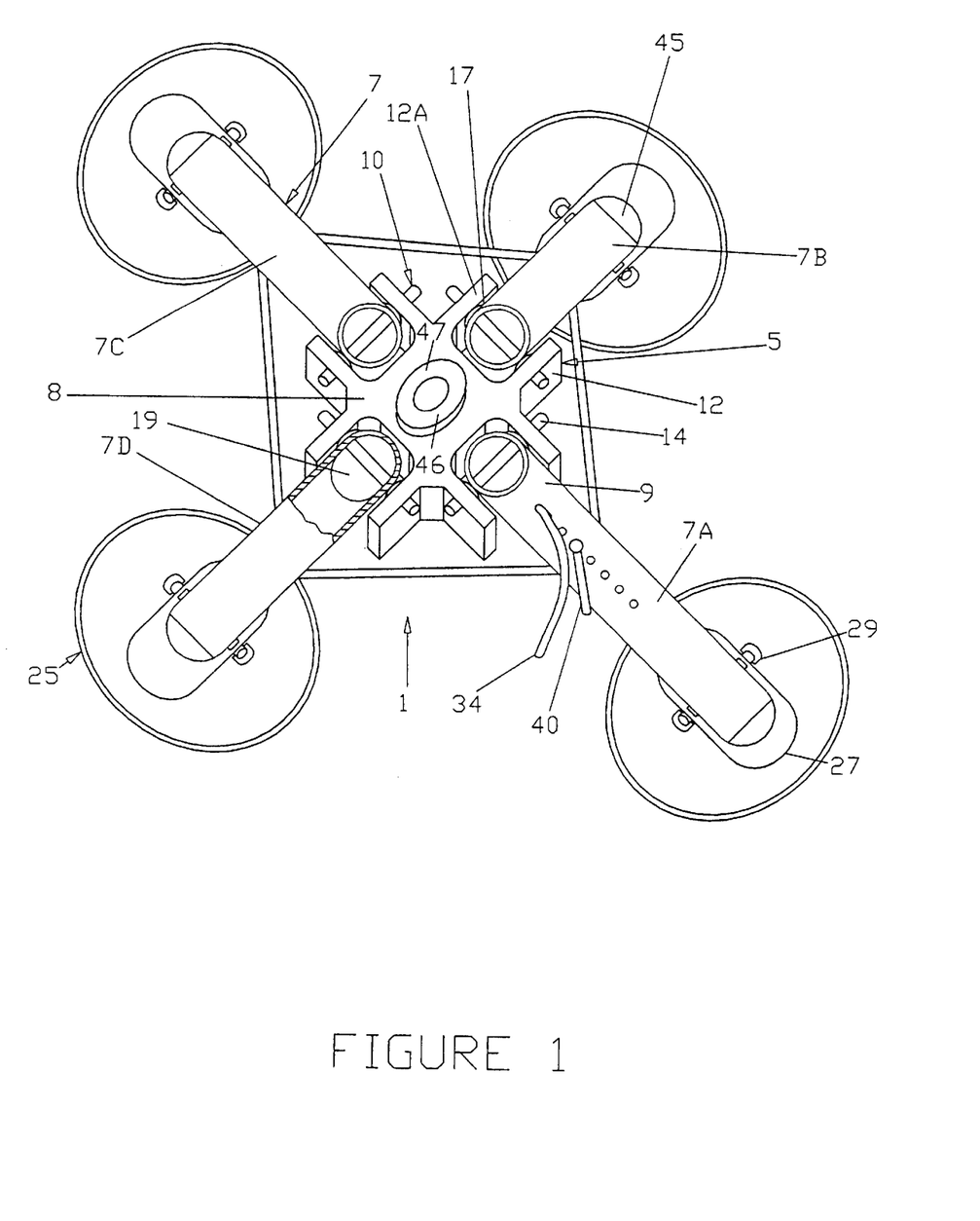
FIG. 1 is a partially broken perspective view of the adjustable base structure of the invention in an operative mode.
Figure 2:
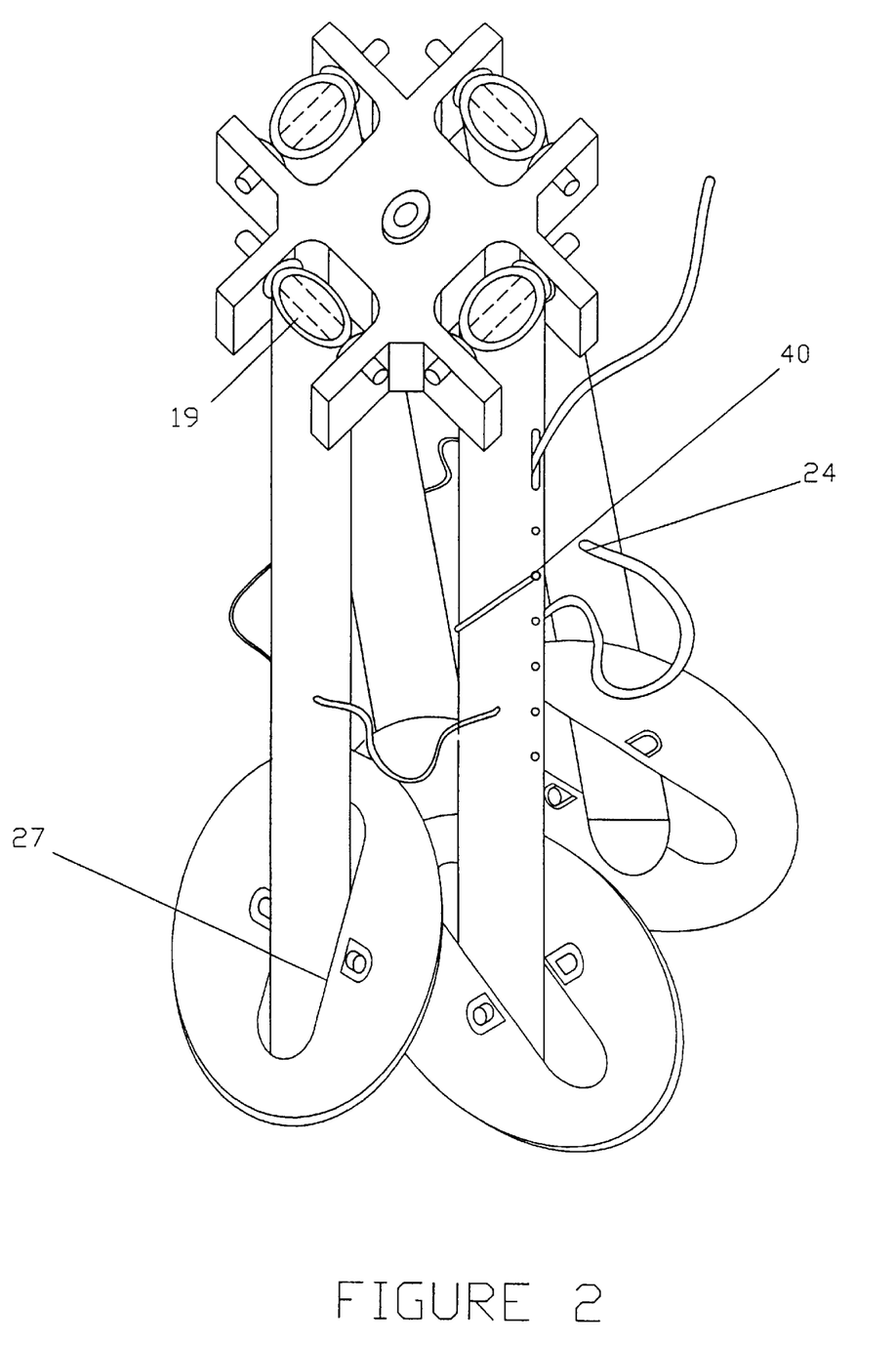
FIG. 2 is a perspective view of the adjustable base structure in the storage mode.

In the preferred embodiment, the plate 5 has a central region 8 and four pairs of lugs 12 and 12A that extend from the center region. Each pivotal connection 10 is in the form of a pin 14 that passes between the lugs 12 and 12A of each pair and also through suitable pin holes in the upper end 9 of each leg. A washer 17 is interposed between the leg and each lug. To provide adequate strength to the legs, a plug 19 is pressed into the upper end of each leg. The plugs 19 may be made from any suitable material having a high bearing strength, such as a hard plastic material. The pins 14 pass through holes in the plugs that align with the pin holes in the legs. As illustrated, the legs 7A and 7C pivot in the same plane, and the legs 7B and 7D pivot in a second plane. The plane containing legs 7A and 7C is perpendicular to the plane containing legs 7B and 7D.

In FIG. 1, the adjustable base structure 1 is shown in an operative mode in which the legs 7A–7D diverge from the plate 5 and from each other. The amount of pivoting of the legs in the operative mode is limited by an adjustment mechanism 22. In the illustrated construction, the adjustment mechanism 22 is a flexible cable 21 that passes through opposed cable holes 25 in each of the legs 7B, 7C, and 7D. The ends of the cable 21 are tied together by a clamp 30, which is hidden inside the leg 7A. The cable 21 passes through opposed cable slots 32 in the leg 7A.

Figure 6:
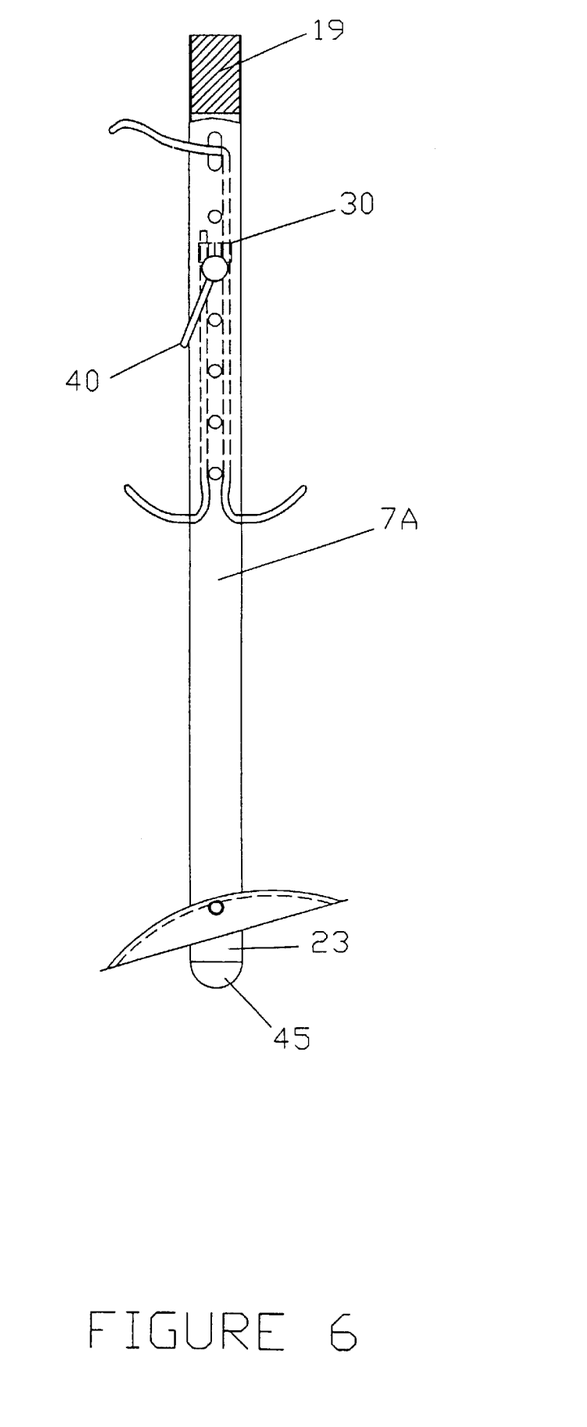
FIG. 6 is a broken front view of a leg of the invention.
Figure 7:
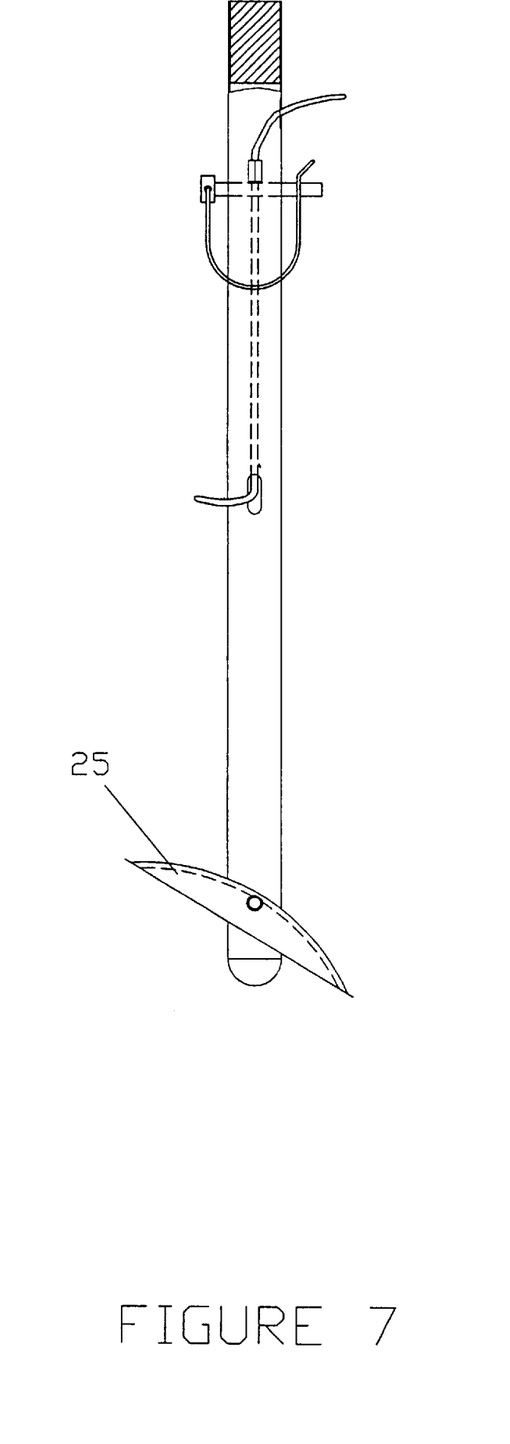
FIG. 7 is a broken side view of FIG. 6.

A tail 34 is tied to the cable 21 near the clamp 30. If desired, the tail 34 may be an extra length of the cable that extends beyond the clamp. The tail emerges from the leg 7A through a tail slot 36. The tail slot 36 is shown as being between the cable slots 32 and the leg upper end 9. However, if desired, the tail slot can be between the cable slots and the leg lower end 23.

Between the cable slots 32 and the tail slot 34 are a number of pairs of through holes 38. A hitch pin 40 is removeably insertable into any of the pairs of holes 38. The hitch pin 40 is inserted such that the cable clamp 30 is between the tail slot 36 and the cable slots 32. Consequently, a length 42 of the cable 21 is stored inside the leg 7A. A shorter length of the cable is therefore available outside of the leg 7A than if no cable were stored inside the leg. The result is that the pivoting of the legs 7A–7D to the operative mode is limited. By inserting the hitch pin into different pairs of holes 38, the amount of pivoting of the legs is adjustable.

A foot 45 of traction-material is inside each leg 7A–7D at the lower end 23 thereof. The legs may be swaged to firmly grip the feet 45. As shown, the portions of the feet outside the legs are hemispherical in shape.

In FIG. 2, the adjustable base structure 1 is shown in a storage mode, in which the legs 7A–7D are close to and parallel to each other and generally perpendicular to the plate 5.

Near the lower end 23 of each leg 7A–7D is a pad 25. The particular pads 25 shown are dome-shaped, with the concave sides toward the legs lower ends 23. Each pad has a cutout 27 that fits loosely over the associated leg. The pad is dimpled at reference numerals 44 on both sides of the cutouts 27 so as to form small walls 46. A rod 29 is pressed through the pad walls 46 and each leg such that the pads can swivel relative to the legs. Preferably, the pads swivel relative to the legs in the same planes that the legs pivot relative to the plate 5. The pads can swivel between a first attitude whereat they are perpendicular to the legs, and a second attitude whereat they are generally alongside the legs. In the second attitude, as shown in FIG. 2, one edge of the pad cutout 27 contacts the associated leg. As best shown in FIG. 6, the foot 45 on the leg lower end protrudes beyond the pad when the pad is swiveled so as to be approximately perpendicular to the leg.

A bushing 58 is pressed in the plate 5. A prelubricated bronze bushing is acceptable. Preferably, the bushing 58 is approximately at the midpoint of the plate. The bushing has a flange 62. Looking also at FIG. 3, a carrier 39 is also part of the invention. The carrier 39 includes a base 48 with a post 41 that is located at the center of the base 48. The post 41 is sized to slidably fit into the plate bushing 58. The post 41 may have a flange 37. The post flange 37 rests on the bushing flange 62 when the post is fit into the bushing 58. See FIG. 4. The carrier base 48 is manufactured with holes that define a standard pattern. The base hole pattern is compatible with the mounting hole patterns of a number of different commercially available products. An example of such a product is a boat seat 47. Accordingly, a person can easily attach a boat seat 47 or similar product to the carrier by four conventional fasteners 49.

Figure 3:
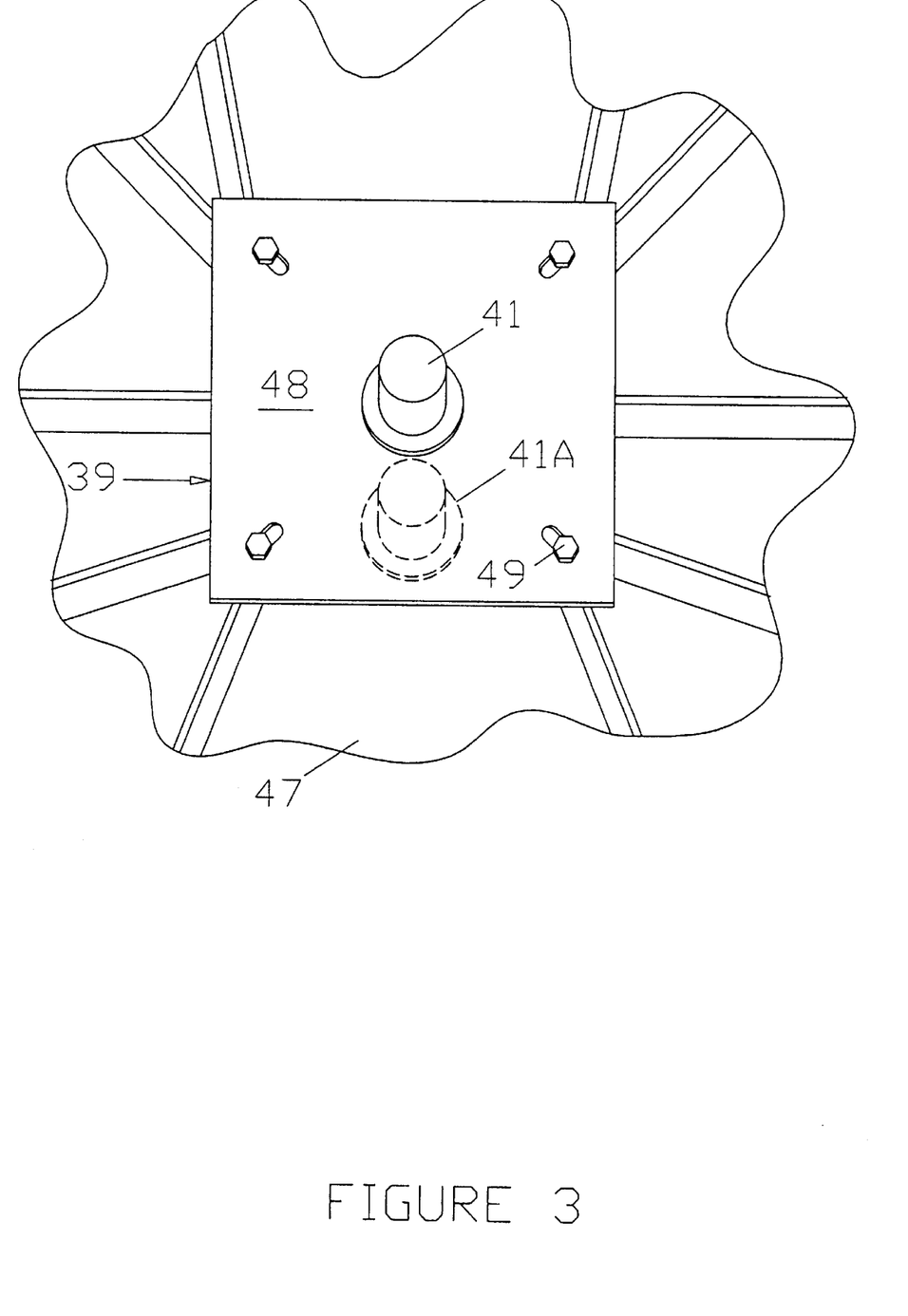
FIG. 3 is a view showing a typical carrier that is part of the present invention, the carrier being attached to a conventional boat seat.
Figure 4:
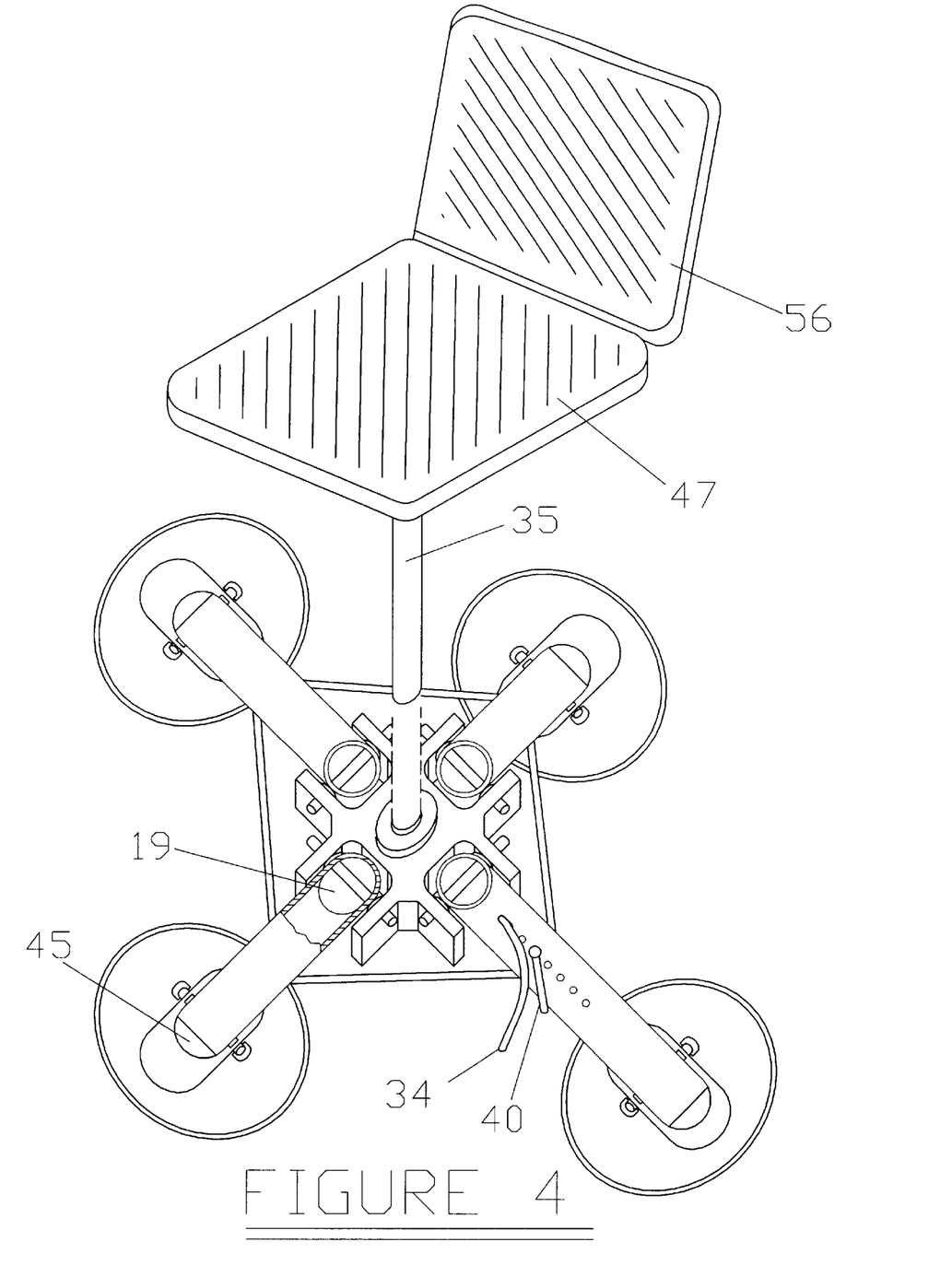
FIG. 4 is an exploded perspective view of a typical boat seat in conjunction with the adjustable base structure.

In FIG. 3, a post 41A with a flange 37A is shown at an alternate location on the carrier base 48 that is offset from the location of the post 41. The post 41A is an alternate construction of the carrier in which the post is offset toward the back 56 of the boat seat 47 or similar seat. When the post 41A is inserted into the plate bushing 58, the seat back 56 is closer to the bushing than the seat is when the post is at the center location of the base. The alternate location of the post 41A is desirable for placing the center of gravity of a person sitting on the boat seat more nearly over the bushing 58 and the plate 5.

The adjustable base structure 1 is used by pivoting the legs 7A–7D from the storage mode of FIG. 2 to the operative mode of FIG. 1. The hitch pin 40 is inserted into the desired pair of holes 38, with the hitch pin being between the cable clamp 30 and the cable slots 32. The particular pair of holes 38 is chosen to give the desired amount of pivoting of the legs when they are in the operative mode. The tail 34 makes it an easy matter to pull the clamp 30 to be at the correct location for the hitch pin.

Figure 5:
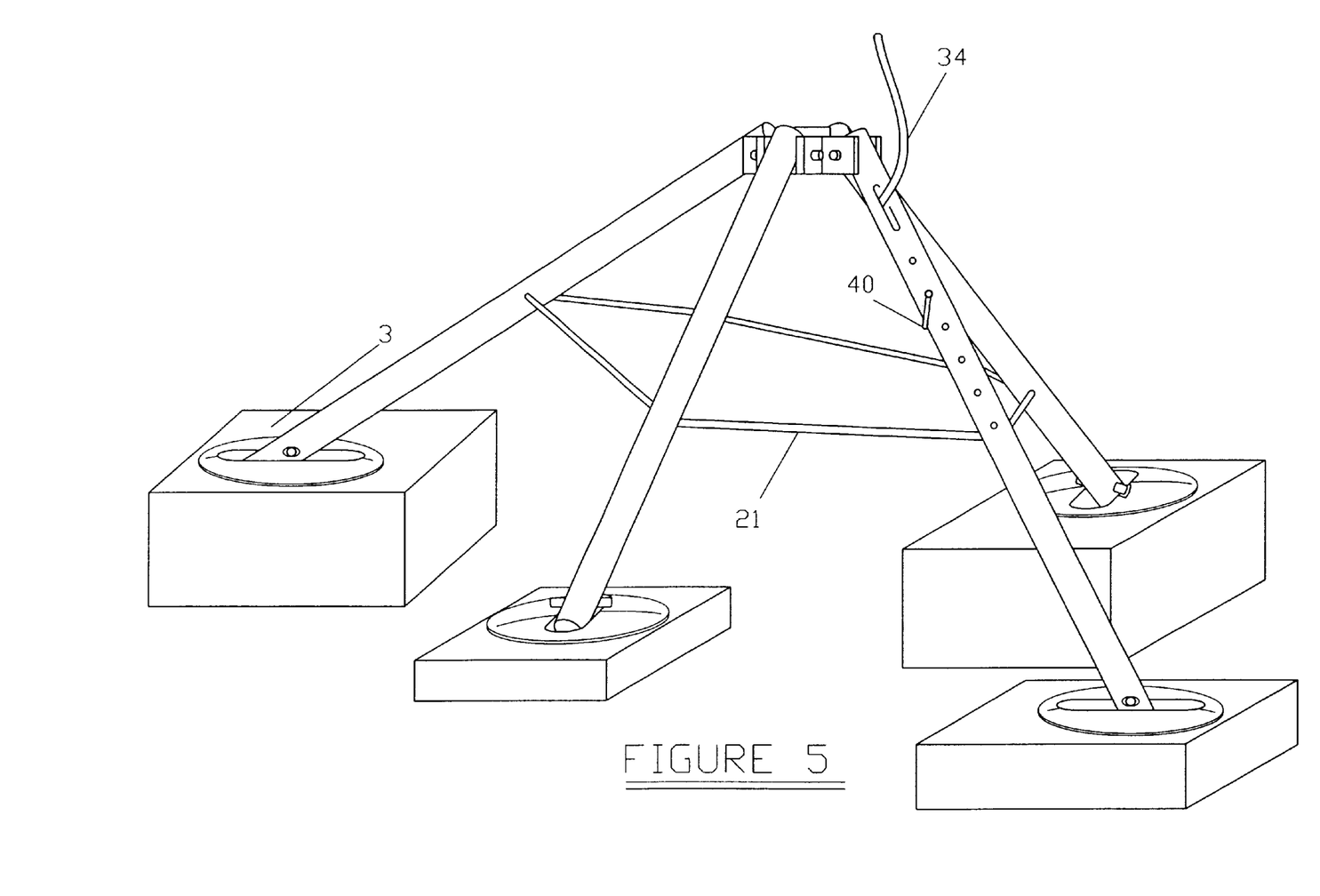
FIG. 5 is a perspective view showing the adjustable base structure supporting a seat on typical uneven terrain.

The legs 7 are independently pivoted relative to the plate 5 and to each other such that the plate 5 is horizontal and all the feet 45 contact the ground 3 and the cable 21 is taut, FIG. 5. When the adjustable base structure 1 is firmly in place on the ground and the plate is horizontal, the carrier 39 and seat 47 can be placed in the plate bushing 58. A person is then able to sit upright and turn the seat 360 degrees in a level attitude, despite the uneven contour of the terrain.

Figure 8:
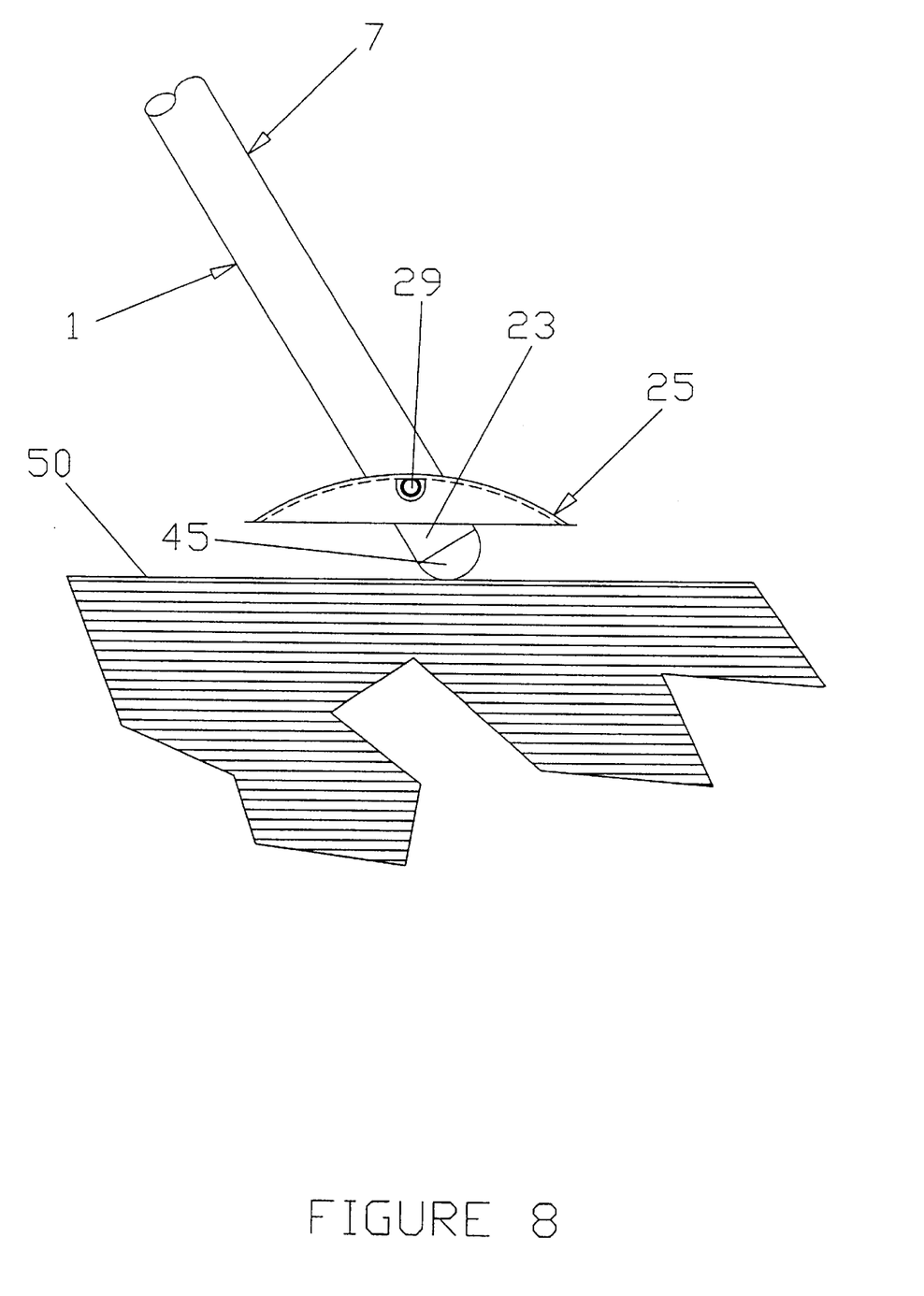
FIG. 8 is a side view of the lower end of a leg in use on hard ground.

In FIG. 8, the adjustable base structure 1 is shown in use on hard ground 50. In that situation, the feet 45 on the lower ends 23 of the legs 7 rest on the ground 50. The pads 25 swivel randomly by gravity by means of their respective rods 29 about the legs.

Figure 9:
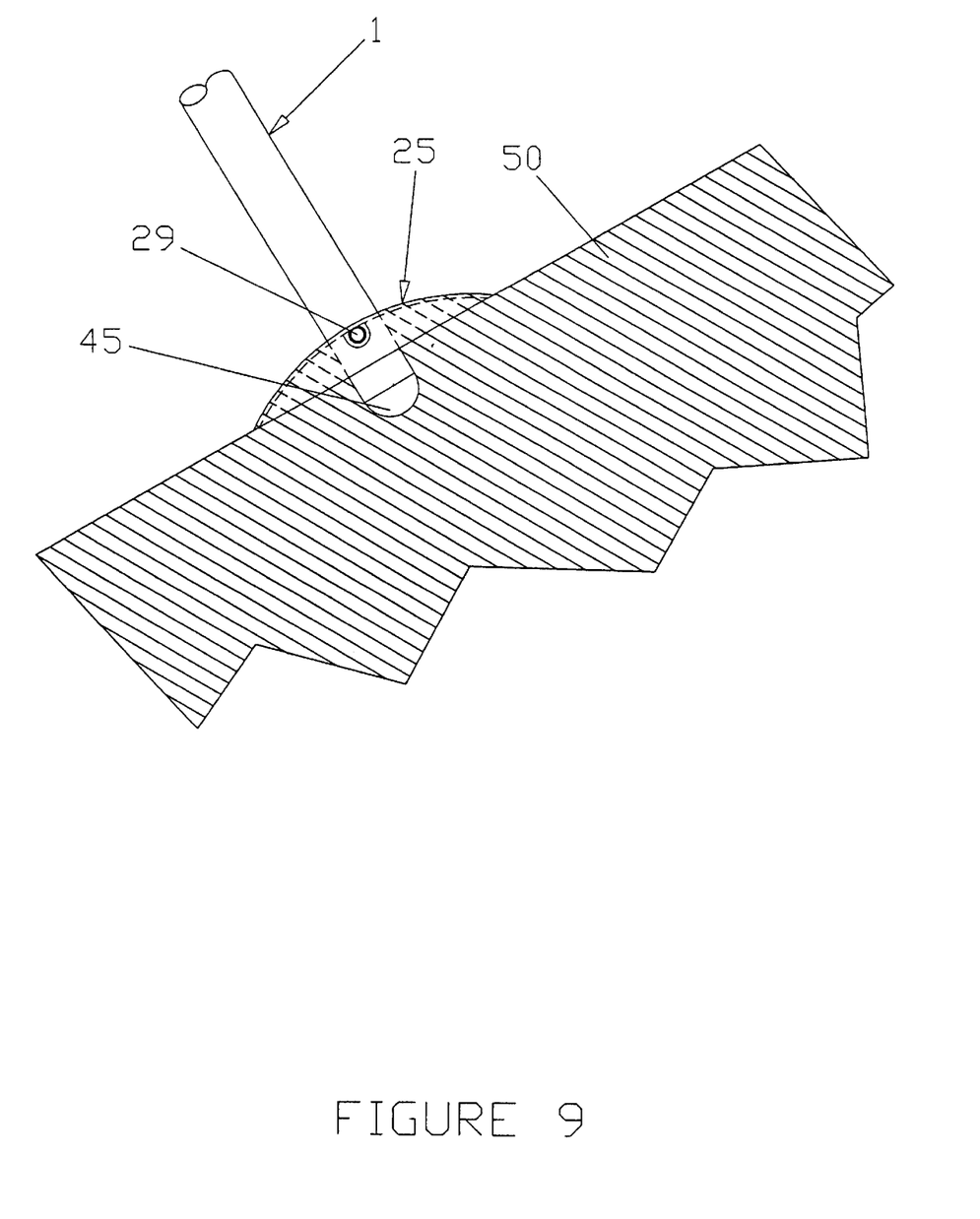
FIG. 9 is a side view of the lower end of a leg in use on soft ground.

In FIG. 9, the adjustable base structure 1 is shown in use on soft soil 54. In that situation, the feet 45 on the legs 7 sink into the soil 54 until the pads 25 contact the soil. The pads automatically swivel by means of the respective rods 29 such that the pads contact the soil. The soil is forced upwardly into the concave sides of the pads, which increases their stability. The adjustable base structure is thus well suited for use in wet or swampy locations.

Figure 10:
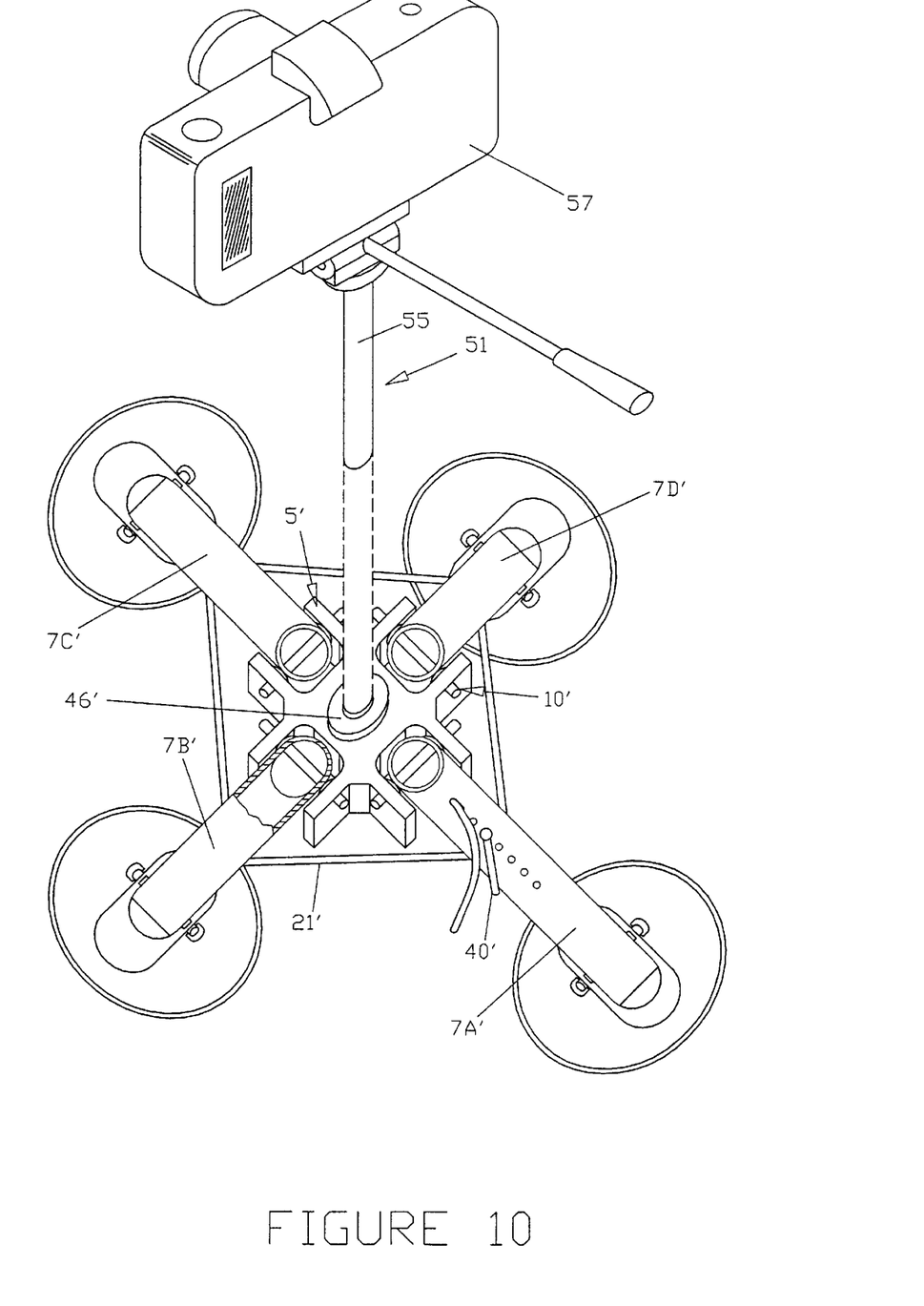
FIG. 10 is a perspective view of the invention in use to hold a camera.

Turning to FIG. 10, a modified adjustable base structure 51 is illustrated. The adjustable base structure 51 is generally similar to the adjustable base structure 1 described above, having pivotal connections 10' between legs 7A'–7D' and a plate 5'. A flexible cable 21' connects the legs 7A'–7D'. The ends of the cable 21' are tied together by a clamp inside the leg 7A'. A hitch pin 40' is used to adjust the amount of pivoting of the legs. A bushing 58' in the plate 5' of the adjustable base structure 51 receives a long bar 55 for a camera 57. By means of the adjustable base structure 51, the camera 57 can be oriented horizontally regardless of the contour of the terrain.

Figure 11:
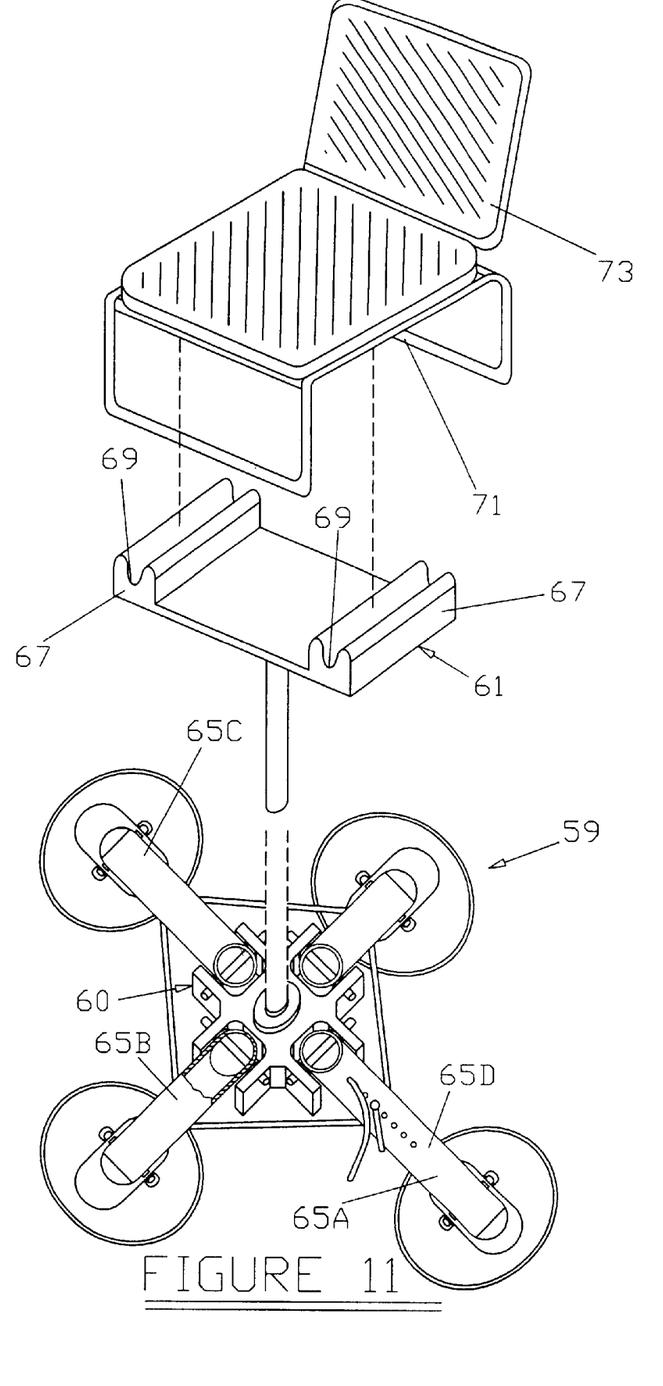
FIG. 11 is an exploded perspective view of a modified embodiment of the invention.

The versatility of the present invention is further demonstrated with regard to FIG. 11. The adjustable base structure 59 of FIG. 8 has a plate 60 with pivotal connections for legs 65A–65D. A carrier 61 is formed with a pair of thick walls 67. The walls 67 have respective parallel concave top surfaces 69. The concave surfaces 69 are sized, shaped, and spaced to receive two horizontal tubes 71 of a conventional lawn chair 73. By using the adjustable base structure 59, a person can sit comfortably upright on the lawn chair 73 even though the ground is not flat.

Figure 12:
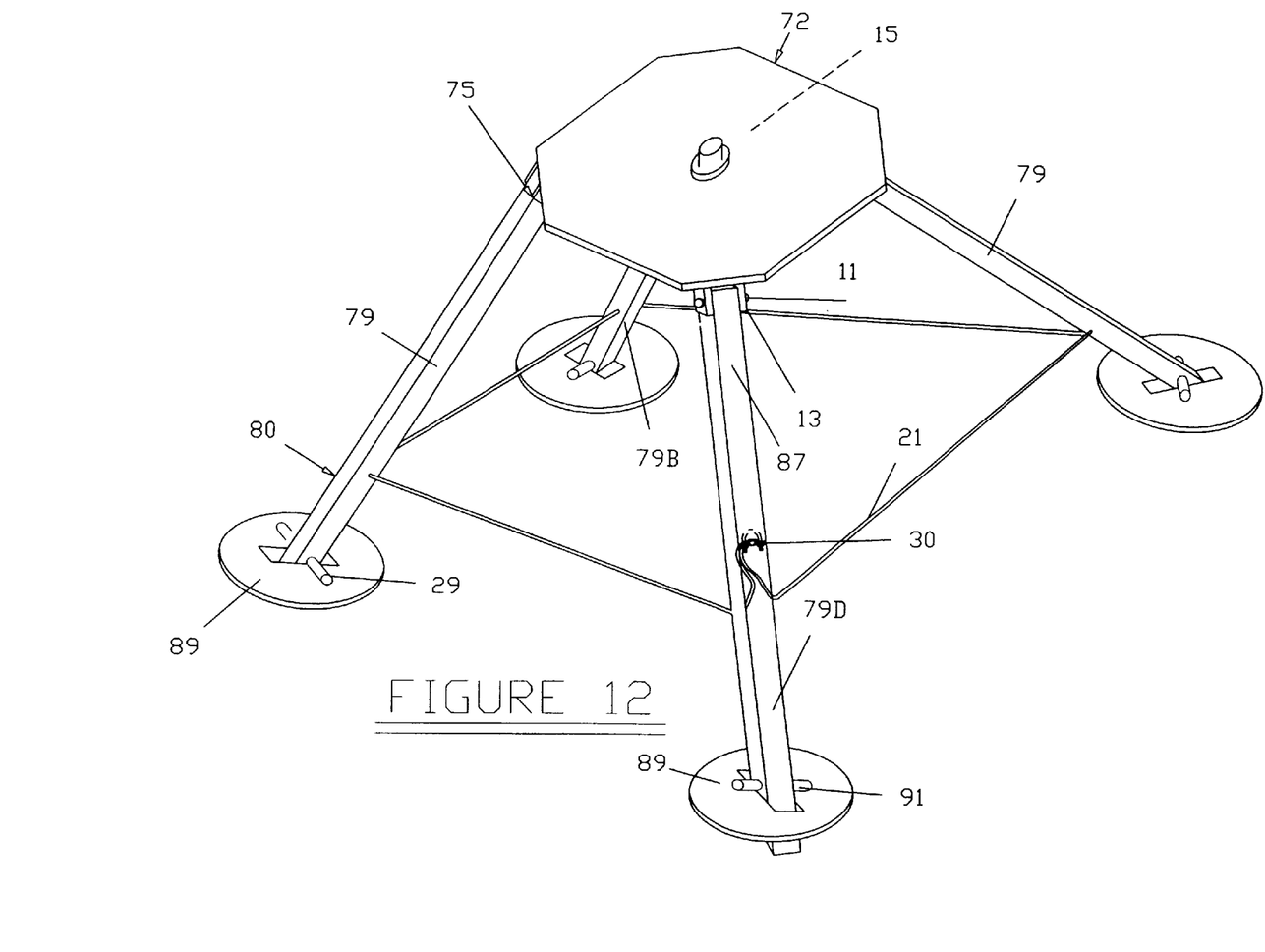
FIG. 12 is a top view of an alternate construction of the present invention in the operative mode.
Figure 13:
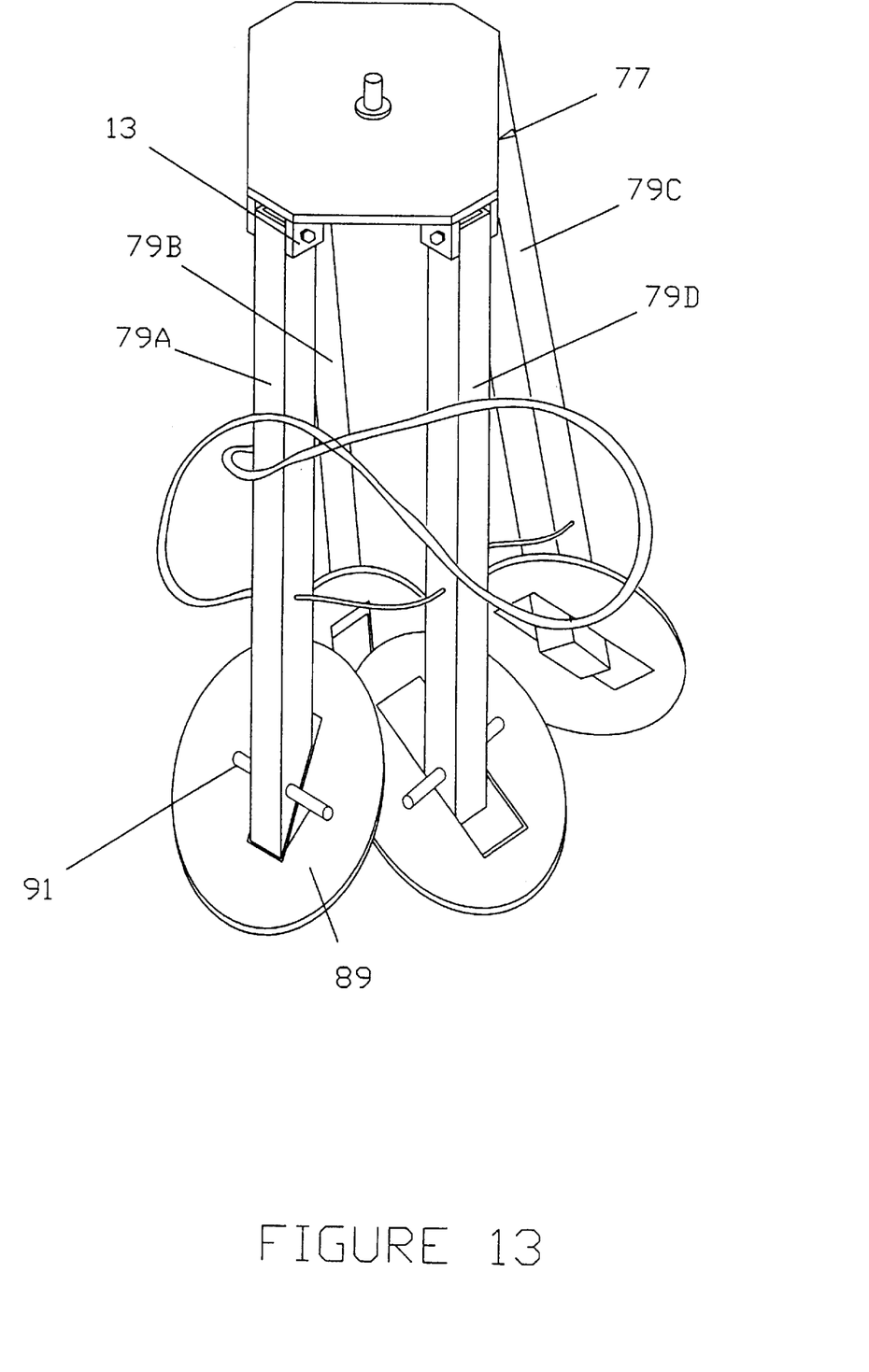
FIG. 13 is a perspective view of the adjustable base structure of FIG. 12 in the storage mode.

FIGS. 12 and 13 depict a further modified embodiment of the invention. The adjustable base structure 80 of FIGS. 12 and 13 has a generally rectangular plate 77 and legs 79A–79D. Each pivotal connection 75 between the plate 77 and a leg 79A–79D is in the form of a pair of lugs 13 that depend from an underside 15 of the plate, and a pin 11 that passes through the lugs and the upper end 87 of the leg. Preferably, a non-metallic bushing surrounds each pin 11, and the legs and lugs 13 are separated by non-metallic washers placed over the bushings.

On the adjustable base structure 80, there is a post 82 on the plate 77. In that design, the carrier, not shown in FIGS. 12 and 13, has a bushing that slidably fits over the post.

The particular adjustable base structure 80 shown has flat pads 89 near the lower ends of the legs 79A–79D. Rods 91 welded to the pads 89 pass through holes in the legs to enable the pads to swivel relative to the legs. As illustrated, pivoting of the legs of the adjustable base structure is not limited by any adjustment mechanism.

The adjustable base structure 80 can be manufactured from a variety of materials. For example, the plate 77 with the lugs 13 can be an aluminum weldment. Aluminum tubing works very well for the legs 79A–79D. The rods 91 may be steel welded to aluminum pads 89. I prefer that the post 82 be steel, and that the carrier bushing be a prelubricated bronze material. A thermosetting plastic material is also satisfactory for the adjustable base structure. In that case, the plate and lugs are integral.

In summary, the results and advantages of seats, chairs, and other supports that are intended for use in upright attitudes can now be more fully realized. The adjustable base structure provides both almost unlimited adaptability in conforming to uneven terrain as well as convenience of use. This desirable result comes from using the combined functions of the pivotable legs and the adjustment mechanism 22. The legs pivot independently of each other such that their lower ends can rest on uneven terrain while simultaneously the plate is oriented horizontal. The adjustment mechanism maintains the legs at the desired positions relative to the plate, the terrain, and each other despite the application of weight to the plate. The pads 25 support the adjustable base structure in soft soil by automatically swiveling by means of their respective rods 29 as the legs lower ends sink into the soil. The adjustable base structure can include a post 35 for a carrier 39 to which is attached a conventional seat 47 or the like. Alternately, a bushing 58 is in the plate, in conjunction with a post that is part of the carrier. The adjustable base structure enables a person to sit upright and turn through 360 degrees about the plate and post regardless of the contour of the terrain. The legs are pivotable to lie alongside each other for collapsing the adjustable base structure into a convenient package for carrying and storing. The plate can be modified to support different objects, such as a post for a camera or a conventional lawn chair.

It will also be recognized that in addition to the superior performance of the present invention, its construction is such as to cost no more than traditional portable seating structures. Also, because it is made of a simple design and with rugged components, the adjustable base structure provides long service life with minimal maintenance.

Thus, it is apparent that there has been provided, in accordance with the invention, an adjustable base structure that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. An adjustable base structure comprising:
   a. a plate having a center region;
   b. means for supporting a selected object on the plate center region;
   c. at least three legs each having first and second ends;
   d. a pivotal connection between the first end of each leg and the plate;
   e. a flexible cable having a predetermined total length consisting of a selected first length and a selected second length, the cable connecting to said at least three legs; and
   f. means for storing the cable first length inside a selected leg and connecting the legs with the cable second length and thereby independently adjusting the pivoting of said at least three legs to an operative mode in which the relative positions of the legs are dependent on the selected cable first and second lengths, so that the legs are independently pivotable relative to each other and to the plate to enable placement of the second ends of the legs on uneven terrain with the plate being oriented substantially horizontal.

2. An adjustable base structure comprising:
   a. a plate having a center region;
   b. means for supporting a selected object on the plate center region;
   c. at least three legs each having first and second ends;
   d. a pivotal connection between the first end of each leg and the plate; and
   e. a flexible cable connecting the legs, wherein:
      i. the cable passes through a pair of first through holes in a selected leg such that there is length of the cable stored in the selected leg; and
      ii. a pin is removably inserted through a pair of second through holes in the selected leg with the pin being between the length of the cable that is stored in the second leg and the pair of first through holes to thereby store the length of the cable that is between the pin and the pair of first through holes,
   so that the legs are independently pivotable relative to each other and to the plate to enable placement of the second ends of the legs on uneven terrain with the plate being oriented substantially horizontal, and the amount of pivoting of the legs is limited by the amount of the cable that is stored in the selected leg.

3. The adjustable base structure of claim 2 wherein the pair of second through holes is between the pair of first through holes and the leg first end.

4. An adjustment base structure comprising:
   a. a plate having a center region;
   b. means for supporting a selected object on the plate center region comprising:
      i. a bushing in the plate central region;
      ii. a carrier having a base, and a post on the base that slidably fits in the plate bushing; and
      iii. a seat supported on the carrier base;
   c. at least three legs each having first and second ends;
   d. a pivotal connection between the first end of each leg and the plate; and
   e. a flexible cable connecting the legs,
   so that the legs are independently pivotable relative to each other and to the plate to enable placement of the second ends of the legs on uneven terrain with the plate being oriented substantially horizontal.

5. The adjustable base structure of claim 4 wherein:
   a. the seat has a back; and
   b. the post is offset from the center of the base in a direction toward the seat back,
   so that the weight of a person sitting on the seat is primarily located over the plate bushing.

6. An adjustable base structure comprising:
   a. a plate having a center region;
   b. means for supporting a selected object on the plate center region;
   c. first and second pairs of legs, each leg having first and second ends;
   d. a pivotal connection between the first end of each leg and the plate, the first pair of legs pivoting in a first plane, the second pair of legs pivoting in a second plane, wherein the first and second planes are substantially perpendicular;
   e. a flexible cable connecting the legs;
   f. a pad in operative association with each leg proximate the second end thereof, each pad having an enclosed cutout that surrounds and receives the associated leg; and
   g. a rod that swivelably joins each pad to the associated leg,
   so that the legs are independently pivotable relative to each other and to the plate to enable placement of the second ends of the legs on uneven terrain with the plate being oriented substantially horizontal.

7. The adjustable base structure of claim 6 wherein each pad is swivelable between a first position whereat the pad is generally perpendicular to the associated leg, and a second position whereat the pad lies generally alongside the associated leg and the pad cutout contacts the leg.

8. The adjustable base structure of claim 6 wherein each pad swivels in the same plane relative to the associated leg as the associated leg pivots relative to the plate.

9. An adjustable base structure comprising:
a. a plate having a center region;
b. means for supporting a selected object on the plate center region;
c. at least three legs each having first and second ends;
d. a pivotal connection between the first end of each leg and the plate;
e. a flexible cable connecting the legs;
f. a pad in operative association with each leg proximate the second end thereof, each pad having a cutout that receives the associated leg, wherein each pad is dome-shaped having convex and concave sides, and wherein each pad concave side is toward the leg second end; and
g. a rod that swivably joins each pad to the associated leg, so that the legs are independently pivotable relative to each other and to the plate to enable placement of the second ends of the legs on uneven terrain with the plate being oriented substantially horizontal.

10. An adjustable base structure comprising:
a. a plate having a center region;
b. means for supporting a selected object on the plate center region comprising:
   i. a post on the plate; and
   ii. a carrier having a bushing that is guided and supported for rotation on the post, the carrier being attachable to a selected seat;
c. at least three legs each having first and second ends;
d. a pivotal connection between the first end of each leg and the plate; and
e. a flexible cable connecting the legs,
   so that the legs are independently pivotable relative to each other and to the plate to enable placement of the second ends of the legs on uneven terrain with the plate being oriented substantially horizontal, and a person sitting on a seat that is attached to the carrier is upright and can turn through 360 degrees in a level condition regardless of the uneven terrain.

11. An adjustable base structure comprising:
a. a plate having a center region;
b. means for supporting a selected object on the plate center region comprising:
   i. a bushing in the plate central region; and
   ii. a carrier having a base with a post that is guided and supported for rotation on the bushing, the carrier base having a pair of upstanding walls having respective concave surfaces that are sized, shaped, and located to receive a selected chair;
c. at last three legs each having first and second ends;
d. a pivotal connection between the first end of each leg and the plate; and
e. a flexible cable connecting the legs,
so that the legs are independently pivotable relative to each other and to the plate to enable placement of the second ends of the legs on uneven terrain with the plate being oriented substantially horizontal, and a person sitting on a chair that is received in the carrier walls concave surfaces is upright and can turn through 360 degree in a level condition regardless of the uneven terrain.

12. Apparatus for stably supporting a seated person in an upright attitude on uneven terrain comprising:
a. a selected seat on which a person sits, the seat having a back;
b. a substantially horizontal plate;
c. means for rotatably supporting the seat on the plate;
d. at least three legs having respective first ends pivotally connected to the plate, and respective second ends; and
f. a cable passing through said at least three legs to limit the amount of pivoting thereof,
   so that the second ends of the legs are placeable on uneven terrain with the plate oriented substantially horizontal to thereby enable the person to sit on the seat in an upright attitude.

13. The apparatus of claim 12 wherein:
a. the plate has a central region with four pairs of lugs extending from the central region; and
b. there are four legs each having a first end pivotally connected between a respective pair of lugs.

14. The apparatus of claim 12 wherein the means for supporting the seat on the plate comprises:
a. a bushing in the plate central region; and
b. a carrier having a base attached to the seat, and a post on the base that is rotatably supported and guided in the plate bushing,
   so that the person can turn the seat and carrier on the plate post while remaining in the upright attitude.

15. The apparatus of claim 12 wherein:
a. the selected seat is a lawn chair; and
b. the means for supporting the selected seat comprises:
   i. a bushing in the plate; and
   ii. a carrier having a base with a post that is rotatably supported and guided on the post, the carrier base having a pair of walls each defining a concave surface that removeably receives a selected portion of the lawn chair,
   so that a person sitting on the lawn chair is supported in an upright attitude on the uneven terrain.

16. The apparatus of claim 12 further comprising a pad in operative association with each leg, each pad having a cutout that receives an associated leg, and a rod secured to the pad, each pad swivelably joining the associated pad to the leg.

17. The apparatus of claim 16 wherein:
a. each pad is swivelable between a first position whereat it is generally perpendicular to the associated leg and a second position whereat the cutout thereof is in contact with the associated leg and the pad lies generally alongside the leg; and
b. the leg second end protrudes a predetermined distance from the pad when the pad is generally perpendicular to the leg.

18. The apparatus of claim 16 wherein each pad is dome-shaped having convex and concave sides, and wherein the pad concave side is toward the leg second end.

19. The apparatus of claim 12 further comprising means for adjusting the pivoting of the legs.

20. The apparatus of claim 12 wherein:
a. the cable passes through first pairs of holes in each of the legs such that there is a length of the cable inside each leg;
b. a selected leg is formed with at least one second pair of holes; and
c. a pin is removeably inserted into said at least one second pair of holes in the selected leg with the pin being between the length of the cable inside the selected leg and the first pair of holes to thereby store a length of the cable inside the selected leg,
   so that the pivoting of the legs is limited by the length of the cable stored inside the selected leg.

21. The apparatus of claim 20 wherein there are a plurality of second pairs of holes in the selected leg, so that the pin is insertable into a selected second pair of holes to thereby adjust the length of the cable stored inside the selected leg and adjustably limit the pivoting of the legs.

22. The apparatus of claim 21 further comprising a tail attached to the length of the cable inside the selected leg and passing out the selected leg to aid in locating the length of the cable that is inside the selected leg when inserting the pin into the selected second pair of holes in the selected leg.

23. A method of supporting a person in an upright attitude on uneven terrain comprising the steps of:

a. providing an adjustable base structure having a plate, and at least three legs with respective first ends pivotally connected to the plate and respective second ends;

b. connecting said at least three legs with a flexible cable;

c. placing the second ends of said at least three legs on uneven terrain and simultaneously placing the plate in a horizontal orientation; and d. supporting a selected seat on the plate, so that a person sitting on the seat is in an upright attitude.

24. The method of claim 23 wherein:

a. the step of Providing an adjustable base structure comprises the step of providing a bushing on the plate; and b. the step of supporting a selected seat comprises the steps of:
  i. providing a carrier with a case and a post;
  ii. attaching the selected seat to the carrier; and
  iii. rotatably supporting and guiding the carrier post on the plate bushing, so that a person sitting on the seat is in an upright attitude and can turn the seat while remaining in an upright attitude.

25. A method of supporting a person in an upright attitude on uneven terrain comprising the steps of:

a. providing an adjustable base structure having a plate, and at least three legs with respective first ends pivotally connected to the plate and respective second ends;

b. connecting said at least three legs with a flexible cable;

c. swivably joining a dome-shaped pad having concave and convex sides to each leg;

d. placing the second ends of said at least three legs on uneven terrain and simultaneously placing the plate in a horizontal orientation;

e. contacting the concave sides of the pads with the terrain that is soft soil and supporting the adjustable base structure on the soft soil; and f. supporting a selected seat on the plate, so that a person sitting on the seat is in an upright attitude.

26. The method of claim 23 comprising the further step of storing a selected length of the cable inside a selected leg and thereby adjusting the pivoting of said at least three legs with respect to each other and to the plate.

27. A method of supporting a person in an upright attitude on uneven terrain comprising the steps:

a. providing an adjustable base structure having a plate, and at Least three legs with respective first ends pivotally connected to the plate and respective second ends;

b. connecting said at least three legs with a flexible cable comprising the step of passing the flexible cable through a first pair of holes in a selected leg such that there is a length of the flexible cable inside the selected leg;

c. placing the second ends of said at least three legs on uneven terrain and simultaneously placing the plate in a horizontal orientation;

d. supporting a selected seat on the plate; and e. adjusting the pivoting of said at least three legs with respect to each other and to the plate comprising the steps of:
  i. providing a plurality of second pairs of holes in the selected leg; and
  ii. inserting a pin into a selected one of the second pairs of holes in the selected leg between the first pair of holes and the length of the flexible cable that is inside the selected leg and thereby limiting the length of the cable available for connecting the legs, so that a person sitting on the seat is in an upright attitude.

* * * * *